US006275348B1

United States Patent
Walsh

(10) Patent No.: US 6,275,348 B1
(45) Date of Patent: Aug. 14, 2001

(54) MAGNETIC TAPE APPARATUS AND METHOD

(75) Inventor: Robert Edward Walsh, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/126,992

(22) Filed: Jul. 31, 1998

(51) Int. Cl.[7] .................................................. G11B 15/46

(52) U.S. Cl. ........................... 360/73.08; 360/73.04; 318/799; 318/271

(58) Field of Search ...................... 360/73.05, 73.08, 360/73.04, 73.06, 73.07; 318/798, 799, 270, 271

(56) References Cited

U.S. PATENT DOCUMENTS

| | | | | |
|---|---|---|---|---|
| 3,563,492 | * | 2/1971 | Ferrier, Jr. | 242/331.4 |
| 3,809,452 | * | 5/1974 | Heinz | 318/271 |
| 3,836,833 | * | 9/1974 | Harris et al. | 318/270 |
| 3,900,890 | * | 8/1975 | Eibner | 360/73.04 |
| 5,473,239 | * | 12/1995 | Kobayashi et al. | 318/798 |

* cited by examiner

Primary Examiner—David Hudspeth
Assistant Examiner—Dan I. Davidson

(57) ABSTRACT

A magnetic tape recording/playback apparatus, and a method of operating the apparatus, which minimises or eliminates the tape damage which is caused by the tape-driving capstan spinning and skidding across the tape at start-up. Initial acceleration of the capstan is held to a relatively low level when capstan speed is below a predetermined value and capstan acceleration is at a higher level at capstan speeds above said predetermined value. Intermediate levels of capstan acceleration can be set for intermediate speeds.

6 Claims, 3 Drawing Sheets

MAGNETIC TAPE APPARATUS AND METHOD

BACKGROUND OF THE INVENTION (1) Field of the Invention:

The present invention generally relates to a magnetic tape apparatus and method for reproducing data from or recording data onto a magnetic tape, and relates more particularly to an improvement in a magnetic tape apparatus and method wherein a tape-driving capstan motor is controlled during its starting acceleration in such a way as to minimise or eliminate slippage between the tape and the tape-driving capstan, and so to minimise or eliminate damage that would otherwise be caused to the tape.

The invention is most particularly concerned with magnetic tape apparatus for the storage and reproduction of digital data for computer systems or the like, but is also applicable to apparatus for other types of digital or analogue data, including video and/or audio data.

(2) Description of the related Art:

A data tape recorder system is a particular form of magnetic tape apparatus. A data tape recorder system typically employs a tape cassette in which a housing contains two rotatably mounted tape reels onto which a length of magnetic tape is wound. During operation of the data tape recorder system either to record data signals onto the magnetic tape or to play back data signals previously recorded on the magnetic tape, the tape is driven at a constant linear speed by means including a capstan rotated at a constant speed by a capstan motor, the tape being pressed against the periphery of the capstan by means of a pinch roller. At commencement of operation, the tape and the tape-driving capstan have to start up from standstill and accelerate to normal operating speed. If rotational acceleration of the capstan at start up is excessive, there will be a very considerable initial excess of capstan speed over tape speed which results in the capstan skidding across the tape, and the tape may be damaged by the capstan spinning with respect to the tape. Such spinning and skidding causes wear and abrasive damage to the tape, and may degrade the tape recorder with internal debris. Such damage is particularly likely in prior art tape recorder systems where the capstan accelerates without special control of acceleration at start up.

SUMMARY OF THE INVENTION

Accordingly, it is an object of the invention to provide an improved magnetic tape apparatus for reproducing data from or recording data onto a magnetic tape and which will minimise or eliminate slippage between the tape and the tape-driving capstan.

Another object of the invention is to provide an improved method of operating a magnetic tape apparatus for reproducing data from or recording data onto a magnetic tape, and which will minimise or eliminate slippage between the tape and the tape-driving capstan.

The above mentioned objects are achieved by a magnetic tape apparatus for reproducing data from or recording data onto a magnetic tape, the apparatus comprising a tape-driving capstan for driving magnetic tape along a tape transport path through the apparatus, the apparatus further comprising control means for controlling the speed of the tape-driving capstan from standstill to a normal operating speed, said control means controlling the acceleration of the tape-driving capstan to a first rate of acceleration while the speed of the tape-driving capstan is below a predetermined value, and said control means controlling the acceleration of the tape-driving capstan to a second rate of acceleration while the speed of the tape-driving capstan is above said predetermined value.

The above-mentioned objects of the invention are also achieved by a method of operating a magnetic tape apparatus for reproducing data from or recording data onto a magnetic tape, the apparatus comprising a tape-driving capstan for driving magnetic tape along a tape transport path through the apparatus, the operating method comprising the steps of controlling the speed of the tape-driving capstan from standstill to a normal operating speed, controlling the acceleration of the tape-driving capstan to a first rate of acceleration while the speed of the tape-driving capstan is below a predetermined value, and controlling the acceleration of the tape-driving capstan to a second rate of acceleration while the speed of the tape-driving capstan is above said predetermined value.

BRIEF DESCRIPTION OF THE DRAWINGS

The above and other objects, features and advantages of the present invention will now be described in greater detail by way of example, with reference to the accompanying drawings wherein.

DETAILED DESCRIPTION OF THE DRAWINGS

Figure 1:
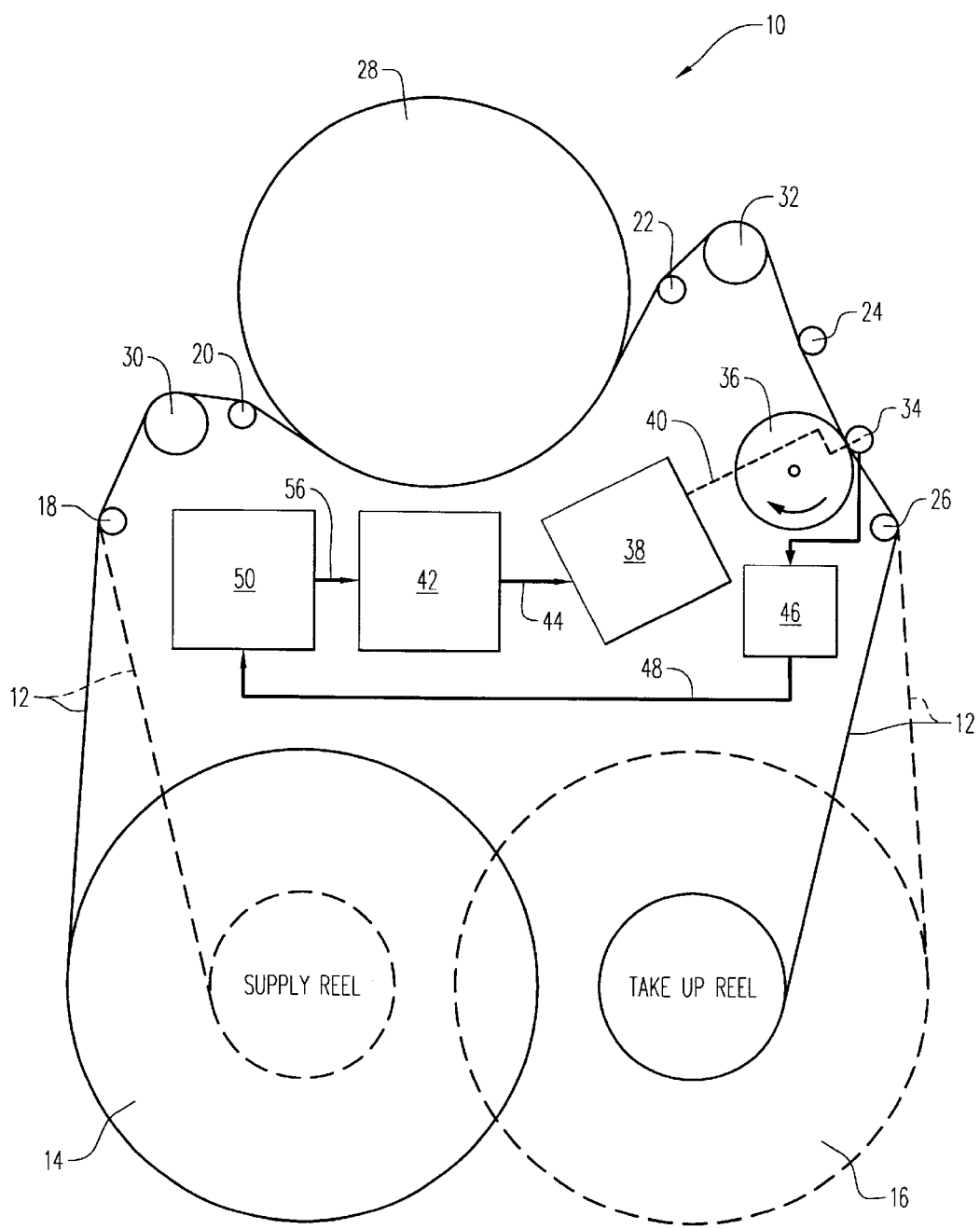
FIG. 1 is a schematic outline of an exemplary embodiment of tape recorder system in accordance with the invention.

Referring first to FIG. 1, this depicts a data tape recorder 10 in part-schematic and part-skeleton form. A magnetic tape 12 is shown following a tape path through the recorder 10 from a supply reel 14 to a take-up reel 16. The tape 12 is guided along its path by guide rollers 18, 20, 22, 24 and 26 which are each freely rotatable about a respective fixed axis normal to the plane of the tape path (the plane of the tape path being the plane of FIG. 1).

Between the supply reel 14 and the first guide roller 18, and also between the last guide roller 26 and the take-up reel 16, the tape 12 will follow a respective path which varies according to the amount of tape already wound onto the respective reel, as shown in FIG. 1 by the alternative full-line/dashed-line tape paths.

Between the guide rollers 20 and 22, the tape 12 is wrapped partly around the periphery of a drum 28 which is fitted in known manner with read/write heads (not shown). In operation of the tape recorder 10, the drum 28 spins around a central axis which is inclined at an angle slightly different from perpendicular to the plane of the path of the tape 12, such that the drum 28 and its read/write heads helically scan the tape 12 in a known manner.

Between the guide rollers 18 and 20, and again between the guide rollers 22 and 24, the tape 12 is tensioned by movable tensioning rollers 30 and 32 respectively. The rollers 30 and 32 are each freely rotatable about a respective axis parallel to the axis of the guide rollers 18–26 (i.e. normal to the plane of the tape path). The rollers 30 and 32 are each mounted on a respective movable mount (not shown) which is movable in the plane of the tape path and biased to bear against the tape 12 as it passes between the respective adjacent pairs of guide rollers, in such a manner as to keep the tape 12 tensioned to suitable levels immediately before and after passage of the tape 12 across the read/write helical scanning drum 28. Details of the movable tensioning rollers and of their mountings are given in published European Patent Application EP-0782136-A1 (assigned jointly to the Assignee of the present invention and to Mitsumi Electric Company).

Between the guide rollers 24 and 26, the tape 12 passes between a tape-driving capstan 34 and a pinch roller 36 which holds the tape 12 against the periphery of the capstan 34. The capstan 34 is linked to a capstan-driving electric motor 38 by means of a shaft 40 and/or suitable gearing as required. To drive the capstan 34, and hence to drive the tape 12 through the recorder 10, the motor 38 is suitably energised from a controllable electric power supply 42 via an electric power supply link 44. It will be understood that the supply reel 14 and the take up reel 16 are also driven by a suitable motor or motors as part of the overall tape drive mechanism.

Those parts of the tape recorder 10 so far detailed are conventional and are presented in order to provide the context for the exemplary embodiments of the invention which will now be described in detail.

These exemplary embodiments will be described in relation to a known type of tape apparatus in which the capstan speed is controlled by monitoring a pulse train having a frequency dependent on the speed of rotation of the capstan 34, and varying the power supplied to the capstan-driving motor on the basis of a comparison between the frequency of the pulse train and at least one predetermined target value. The target value defines the normal operating speed of the capstan. The power (in this example, specifically, the voltage) supplied to the capstan-driving motor is ramped up or down depending on the difference between the actual capstan speed and the target value.

In the present example, the above mentioned problem of the capstan spinning on the tape surface may be attributed to the fact that the voltage applied to the capstan-driving motor is ramped up to an excessive degree because of the very low frequency of the pulse train when the capstan initially starts up from rest, causing the capstan to accelerate rapidly to an excessive speed before being corrected in response to the increased pulse train frequency.

Figure 2:
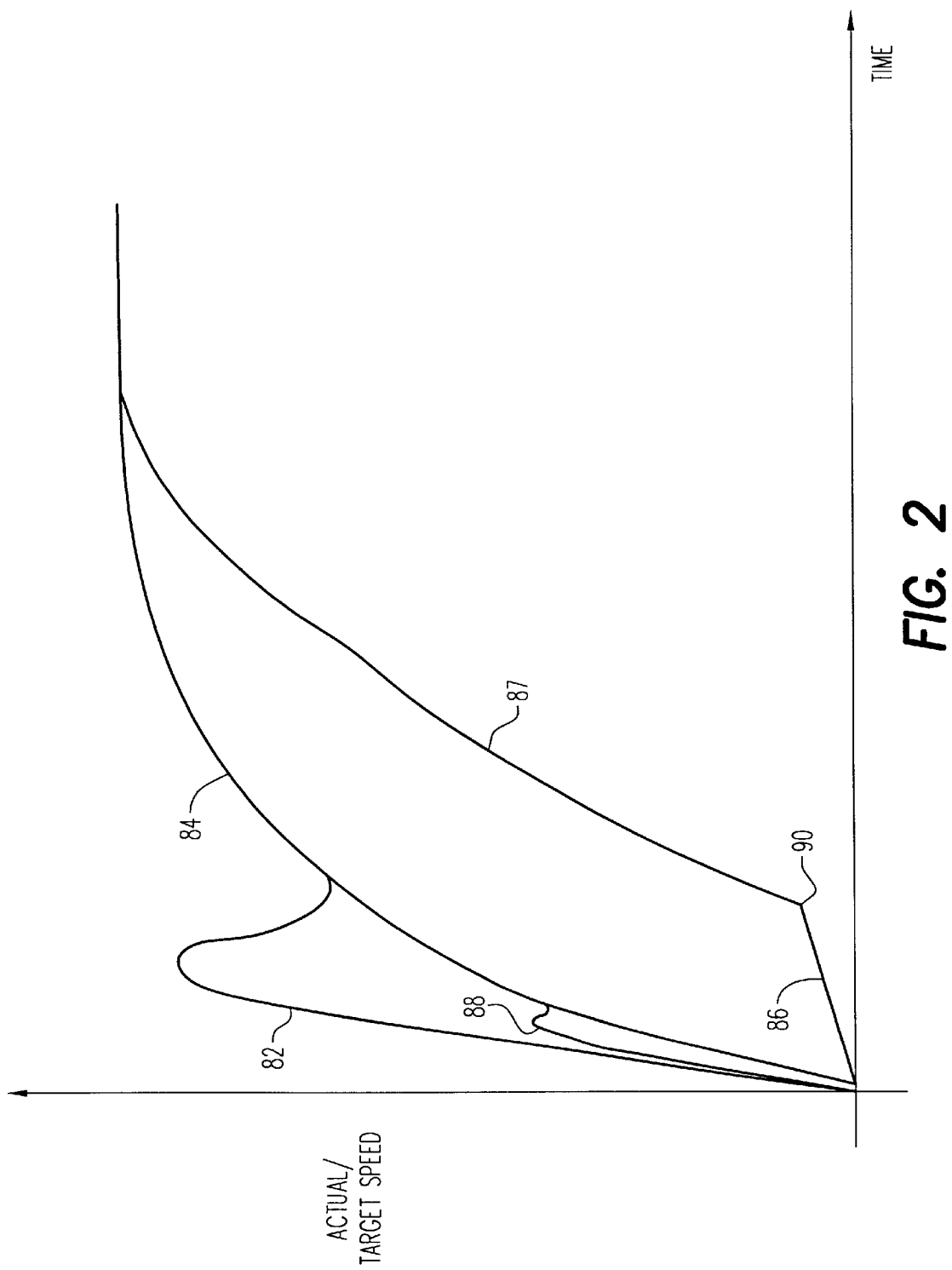
FIG. 2 is a graph of capstan target speed and actual speed versus time, in respect of performance characteristics of the exemplary embodiment of the present invention and of the prior art.

This is illustrated in FIG. 2, which is a graph of speed against time, showing actual and target capstan speed profiles from initial start up to normal operating speed.

Before detailing those parts of the FIG. 1 arrangement that particularly relate to the preferred embodiment of the present invention, reference is directed to FIG. 2 which includes a representation of the problems of the prior art, and which are mitigated or avoided by means of the present invention. (The term "normal operating speed" as used below and in the claims refers to the speed appropriate for recording and playback; the capstan speed will be lower than normal operating speed while the capstan is accelerating up to normal operating speed, and it may be possible for the capstan to be driven at a speed which is far faster than normal operating speed.)

In general terms, FIG. 2 is a graph of variations of actual-and target capstan speed (vertical axis) with respect to time (horizontal axis). Specific units are not shown, since these are not necessary for an understanding of the principles involved. At the origin (coordinates 0,0), the capstan speed is zero and "zero time" is the instant that start-up is initiated.

When start-up is initiated in a prior art tape recorder, the capstan is generally accelerated at a maximal rate. However, due to the limited traction that can be applied to the tape due to the limited area of mutual contact between the capstan and the tape, together with the inertia of the tape, the tape reels, the guide rollers, and the scanning drum, speed of the tape lags behind speed of the tape-driving capstan. This is indicated in FIG. 2 by the curve 82 which shows the prior art capstan accelerating very rapidly to full speed at start-up, by following the target speed profile depicted by the curve 84.

This results in a very considerable initial excess of capstan speed over tape speed in prior art tape recorders causing the capstan to skid across the tape, analogous to an automobile making a racing start and spinning its wheels. Such skidding causes wear and abrasive damage to the tape, and may degrade the tape recorder with internal debris. Such a performance characteristic is therefore undesirable.

This undesirable characteristic of the prior art is avoided in accordance with the present invention by limiting acceleration of the capstan at lower capstan speeds, particularly between standstill and a predetermined capstan speed value. This is achieved by having the capstan speed follow a dual ramp rate target speed profile depicted in FIG. 2 by the curve 86,87 which is notably lower than the prior art target speed curve 84 while the tape speed is still much lower than normal operating tape speed. The resultant start-up velocity of the capstan is depicted by the curve 88, which shows a much lower excess of capstan speed over target speed than the prior art, and consequently much reduced skidding that more or less avoids damage to the tape.

Once the capstan and the tape have reached said predetermined speed value, the capstan acceleration rate is increased from its initially reduced level, as depicted in FIG. 2 by the transition 90 from the initial target 86 to normal target 87. By waiting until the capstan speed has reached a predetermined value before applying a higher acceleration rate, skidding of the capstan on the tape can be minimised or avoided.

Figure 3:
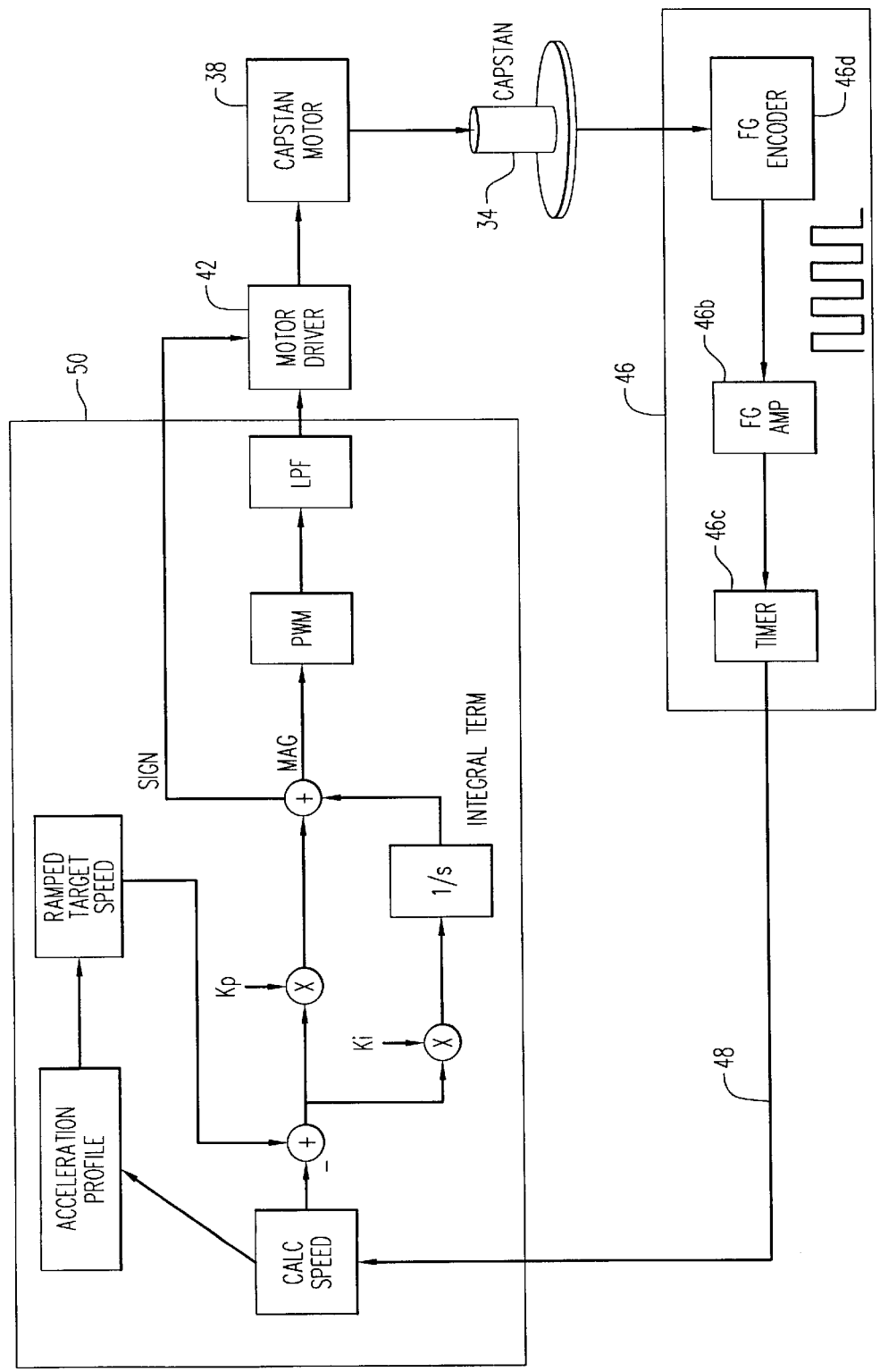
FIG. 3 is a block diagram showing a preferred embodiment of a control system of a tape recorder system in accordance with the present invention.

The means by which the above described method of operating a tape recorder in accordance with the invention can be carried out will now be described with further reference to FIGS. 1 and 3.

A capstan speed sensor 46 is coupled to the capstan 34 such as to produce a capstan-speed-dependent output signal on an output line 48. The sensor 46 can take any suitable form which senses the rotational speed of the capstan 34 and produces a proportionate output signal. In the embodiments shown in FIG. 3, the capstan speed sensor 46 includes a frequency generator encoder 46a, an amplifier 46b and a timing circuit 46c.

A control circuit 50 is coupled to the line 48 to receive the capstan-speed-dependent output from the sensor 46. The control circuit 50 includes a servo control circuit which stores pre-programmed acceleration profiles/desired target speed profiles to generate control signals for the capstan motor drive. The output of the control circuit 50 is coupled via a signal line 56 to the capstan motor power supply 42.

The control circuit 50 functions to evaluate the capstan-speed-dependent signal on the line 48 and to calculate the shortfall in the actual speed of the capstan 34 as sensed by the capstan speed sensor 46 with respect to a target speed which is normally the capstan speed that gives the tape 12 its normal operating speed along the tape path through the tape recorder 10. Immediately at commencement of start-up, the capstan 34 and the tape 12 are stationary, and consequently the shortfall is total.

In a prior art tape recorder, the power supply would be operated upon start-up to ramp up the voltage driving the capstan motor such as to increase the speed of the capstan motor (and hence to increase the speed of the motor-driven capstan) to match a predetermined speed/time curve. The actual capstan speed is measured by a capstan-driven pulse generator, and the speed measurement signal is fed back to the power supply by way of a control loop which includes an integrator. Since the capstan speed at start-up is momentarily very low, the pulse-dependent feedback is also very slow and this situation allows the motor voltage to ramp up excessively between the first two pulses of the capstan speed measurement. The consequence of the high motor voltage is the acceleration spike 82, which results in damage to the tape as previously detailed.

However, in the present invention the control circuit 50 additionally assesses the capstan speed as being above or below a predetermined value, and for so long as the actual capstan speed is below a said predetermined value, the control circuit sets the acceleration rate at a first value which determines the capstan target speed as depicted by the line 86 in the graph of FIG. 2.

The setting of the acceleration rate at this first value is the consequence of setting the capstan speed target profile which is compared to the actual speed in order to generate a capstan speed error signal which is fed through the servo control loop to generate a drive value signal which is processed by the control circuit to produce a motor controlling signal based on predetermined values stored within the control circuit. This control signal is used to generate a DC voltage to drive the capstan motor.

As the capstan 34 accelerates, the control circuit 50 continues its assessment of capstan speed (as determined by the sensor 46), and when the control circuit 50 determines that the capstan speed has risen to said predetermined value, the control circuit 50 selects a higher acceleration rate which corresponds to the capstan target profile designated by the curve 87 in FIG. 2. The predetermined value may, for example, be one-third such of normal capstan speed.

If desired the control circuit 50 can be modified from the arrangement described above to a form which provides intermediate accelerations at intermediate speeds. In this modification, the acceleration rate/target speed profile is set to a low value while the capstan speed is below a first predetermined fraction of normal operating speed, is set to an intermediate value while the capstan speed is above the first predetermined value but below a second predetermined value (the second predetermined value being greater than the first predetermined value), and is set to a high value while the capstan speed is above the second predetermined value fraction.

The capstan motor power supply 42 can take any suitable form, and may (for example) be a DC (direct current) supply whose mean output level is varied by controlled pulse-width modulation of a switching-type DC supply, control of the mark/space ratio being effected (for example) by an analogue DC signal on the line 56. The capstan motor 38 can be of any suitable form, and may (for example) be a DC motor with a commutator-fed armature, and a permanent magnet field or a separately excited field.

The capstan speed sensor 46 can take any suitable form, and may (for example) comprise an optical sensor cooperating with a chopper disc mounted on the shaft 40 to produce a pulsed output signal whose pulse repetition frequency is directly proportional to the rotational speed of the capstan 34. Either within the sensor 46 or within the control circuit 50, the pulsed speed signal can be low-pass filtered, AC-coupled, rectified and smoothed to produce an analogue DC signal whose level is indicative of capstan speed.

The supply reel 14 and the take-up reel 16 can be mounted in a known form of cassette (not shown) or cartridge (not shown) which houses both reels. Alternatively, the take-up reel 16 can be a permanent part of the tape recorder 10, with the tape 12 being supplied in a one-reel cartridge (not shown), the tape recorder 10 comprising means (not shown) of known form to pull a tape leader from the cartridge to the take-up reel 16.

While a preferred embodiment of the invention has been described with reference to the accompanying drawings, the invention is not restricted to the form described. Modifications and variations of the described embodiment can be adopted without departing from the scope and spirit of the invention.

What is claimed is:

1. A magnetic tape apparatus for reproducing data from or recording data onto a magnetic tape, the apparatus comprising a tape-driving capstan for driving magnetic tape along a tape transport path through the apparatus, the apparatus further comprising control means for controlling the speed of the tape-driving capstan from standstill to a normal operating speed, said control means controlling the acceleration of the tape-driving capstan to a first rate of acceleration while the speed of the tape-driving capstan is below a predetermined value, and said control means controlling the acceleration of the tape-driving capstan to a second rate of acceleration while the speed of the tape-driving capstan is above said predetermined value, wherein said first acceleration rate is less than said second acceleration rate.

2. A magnetic tape apparatus as claimed in claim 1, further comprising target speed setting means for setting a predetermined target speed for said capstan, said target speed being dependent on said acceleration rate and on the actual capstan speed.

3. A magnetic tape apparatus as claimed in claim 1, wherein said control means controls the acceleration of the tape-driving capstan to said first rate of acceleration while the speed of the tape-driving capstan is below a first predetermined value, said control means controls the acceleration of the tape-driving capstan to said second rate of acceleration while the speed of the tape-driving capstan is above a second predetermined value, said second predetermined value exceeding said first predetermined value, and wherein said control means controls the acceleration of the tape-driving capstan to a third rate of acceleration intermediate said first and second rates of acceleration while the speed of the tape-driving capstan is intermediate said first and second values.

4. A method of operating a magnetic tape apparatus for reproducing data from or recording data onto a magnetic tape, the apparatus comprising a tape-driving capstan for driving magnetic tape along a tape transport path through the apparatus, the operating method comprising the steps of controlling the speed of the tape-driving capstan from standstill to a normal operating speed, controlling the acceleration of the tape-driving capstan to a first rate of acceleration while the speed of the tape-driving capstan is below a predetermined value, and controlling the acceleration of the tape-driving capstan to a second rate of acceleration while the speed of the tape-driving capstan is above said predetermined value, wherein said first acceleration rate is less than said second acceleration rate.

5. A method of operating a magnetic tape apparatus as claimed in claim 4, including the step of setting a predetermined target speed for said capstan, said target speed being dependent on said acceleration rate and on the actual capstan speed.

6. A method of operating a magnetic tape apparatus as claimed in claim 5, including the step of controlling the acceleration of the tape-driving capstan to said first rate of acceleration while the speed of the tape-driving capstan is below a first predetermined value, controlling the acceleration of the tape-driving capstan to said second rate of acceleration while the speed of the tape-driving capstan is above a second predetermined value, said second predetermined value exceeding said first predetermined value, and controlling the acceleration of the tape-driving capstan to a third rate of acceleration intermediate said first and second rates of acceleration while the speed of the tape-driving capstan is intermediate said first and second values.

* * * * *